United States Patent
Averbuch et al.

(10) Patent No.: US 9,739,267 B2
(45) Date of Patent: Aug. 22, 2017

(54) WIND TURBINE ON A FLOATING SUPPORT STABILIZED BY A RAISED ANCHORING SYSTEM

(71) Applicant: IFP Energies nouvelles, Rueil-Malmaison (FR)

(72) Inventors: Daniel Averbuch, Vernaison (FR); Yann Poirette, Reventin-vaugris (FR); Timothee Perdrizet, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 342 days.

(21) Appl. No.: 14/396,984

(22) PCT Filed: Apr. 10, 2013

(86) PCT No.: PCT/FR2013/050776
§ 371 (c)(1),
(2) Date: Oct. 24, 2014

(87) PCT Pub. No.: WO2013/160579
PCT Pub. Date: Oct. 31, 2013

(65) Prior Publication Data
US 2015/0071779 A1     Mar. 12, 2015

(30) Foreign Application Priority Data
Apr. 27, 2012   (FR) ...................... 12 01253

(51) Int. Cl.
*F03D 11/04*    (2006.01)
*F03D 7/02*     (2006.01)
(Continued)

(52) U.S. Cl.
CPC ............ *F03D 11/045* (2013.01); *B63B 21/50* (2013.01); *F03D 7/02* (2013.01); *F03D 13/10* (2016.05);
(Continued)

(58) Field of Classification Search
CPC .......... F03D 13/22; F03D 13/25; F03D 1/001; F03D 7/02; F05B 2240/93; F05B 2240/95;
(Continued)

(56) References Cited

U.S. PATENT DOCUMENTS

2011/0006539 A1*   1/2011   Lefranc ................... F03D 9/005
                                                        290/55

FOREIGN PATENT DOCUMENTS

DE    102008029982 A1    12/2009
DE    102009057794 A1    6/2011
(Continued)

OTHER PUBLICATIONS

English machine translation of DE 10 2008 029 982, Dec. 2009.*
(Continued)

*Primary Examiner* — Christopher Verdier
(74) *Attorney, Agent, or Firm* — Fitch, Even, Tabin & Flanney, LLP (57) ABSTRACT

A wind power system includes a wind turbine resting on a floating support and an anchoring system for anchoring the wind power system connected to the wind power system by attachment points. The wind power system has the attachment points raised above the waterline of the floating support to a height with respect to the waterline determined so as to counterbalance an overturning moment of the wind turbine subjected to a given wind speed.

14 Claims, 9 Drawing Sheets

(51) Int. Cl.
    *F03D 13/20*     (2016.01)
    *F03D 13/25*     (2016.01)
    *F03D 13/10*     (2016.01)
    *B63B 21/50*     (2006.01)

(52) U.S. Cl.
    CPC ............. *F03D 13/22* (2016.05); *F03D 13/25* (2016.05); *F05B 2240/93* (2013.01); *F05B 2240/97* (2013.01); *Y02E 10/723* (2013.01); *Y02E 10/727* (2013.01)

(58) Field of Classification Search
    CPC ... F05B 2240/97; Y02E 10/723; Y02E 10/727
    USPC ................................ 415/3.1, 906; 416/85, 86
    See application file for complete search history.

(56) References Cited

FOREIGN PATENT DOCUMENTS

| JP | 2010-520401 A | 6/2010 |
|---|---|---|
| WO | 2011/083021 A2 | 7/2011 |

OTHER PUBLICATIONS

English machine translation of DE 10 2009 057 794, Jun. 2011.*
Office Action of JP Appln. No. 2015-507579 dated Jan. 17, 2017 with partial English translation.

* cited by examiner

WIND TURBINE ON A FLOATING SUPPORT STABILIZED BY A RAISED ANCHORING SYSTEM

FIELD OF THE INVENTION

The object of the present invention relates to offshore wind turbines on a floating support and more particularly to systems for stabilizing the floating support in the presence of wind-generated forces on the turbine.

BACKGROUND OF THE INVENTION

In the case of a standard 5-MW wind turbine, the nacelle can carry a rotor made up of three blades (about 60 m long for example) that drives, through the agency of a gear reducer, the rotating part of an electric generator and accessories such as the blade orientation system, electric transformers, a hydraulic system, a ventilation system. The structure of the nacelle rests on a slewing ring itself supported by the tower.

The rotor plane is oriented into the wind. The nacelle is therefore rotatably mobile with respect to the axis of the tower, by means of one (or more) motor-driven gears cooperating with a ring gear. The overall weight of a nacelle can be of the order of 200 to 300 tons.

The approximately 100-m high tower supporting the nacelle rests on a floating support held in position by anchor lines in the case of water depths greater than 50 m.

Floating wind turbines comprise floating support and anchoring systems of various kinds, systems whose one purpose is to limit the movements and accelerations at the turbine under the action of the marine environment (wind, current, wave). However, the specific issue of floating wind turbines is that a significant overturning moment is created by the thrust force of the rotor in operation, applied approximately on the nacelle. When the wind turbine is stopped, the thrust force is reduced and its application point is offset downward.

Indeed, the rotor of the wind turbine undergoes many forces and stresses linked with the wind speed. This results in a thrust on the rotor supported by a thrust bearing. The value of this thrust force oriented in the direction of the wind depends on the angle of the blades (pitch) with respect to the direction of the wind.

One important parameter for dimensioning a floating wind turbine is the inclination of the floater (and therefore of the rotor) since wind turbines cannot operate above relatively moderate inclinations (typically some degrees).

It is therefore necessary to design a floater and its anchoring system so as to limit the list and the trim thereof, and a fortiori the pitch and roll motions.

Floating supports of all types (semi-submersible, spar, TLP), sized to limit pitch and roll motions notably under the effect of the overturning moment generated by the wind turbine, are known. These floaters are respectively based on the creation of a reaction moment under the action of hydrostatic stresses, weights or anchor tension. Thus, in wind power systems of the prior art, the floater provides the hydrostatic stiffness required to limit the inclination under the effect of loads.

However, relying on the dimensions of the floaters can generate, depending on the conditions of use, oversizing or even undersizing under exceptional conditions (strong winds, etc.).

The object of the present invention is to provide a particular layout for the anchor means so as to limit the list and trim, as well as pitch and roll motions, notably under the effect of the overturning moment generated by the wind turbine for a given floating support.

SUMMARY OF THE INVENTION

In general terms, the present invention relates to a wind power system comprising a wind turbine resting on a floating support and means for anchoring the system connected to said system by attachment points. The system furthermore comprises means for raising said attachment points above the waterline of said floating support, the raising means raising the attachment points to a height with respect to the waterline determined so as to counterbalance the overturning moment of the wind turbine subjected to a given wind speed.

According to the invention, the attachment points can be located above the freeboard of the floating support.

According to one embodiment, the raising means comprise beams, or beams and cables. The beams can be tubular metal supports, or metal supports of variable section, or truss beams.

According to an embodiment, the raising means are mechanically connected to the tower of the wind turbine.

According to another embodiment, the raising means are mechanically connected to one another by beams or cables, so as to provide flexural stiffening of said raising means.

According to the invention, the raising means can consist of an extension of the columns of the floater.

Finally, the attachment points can be located at different heights.

BRIEF DESCRIPTION OF THE FIGURES

Other features and advantages of the invention will be clear from reading the description hereafter of embodiments given by way of non limitative example, with reference to the accompanying figures wherein.

DETAILED DESCRIPTION

Figure 1:
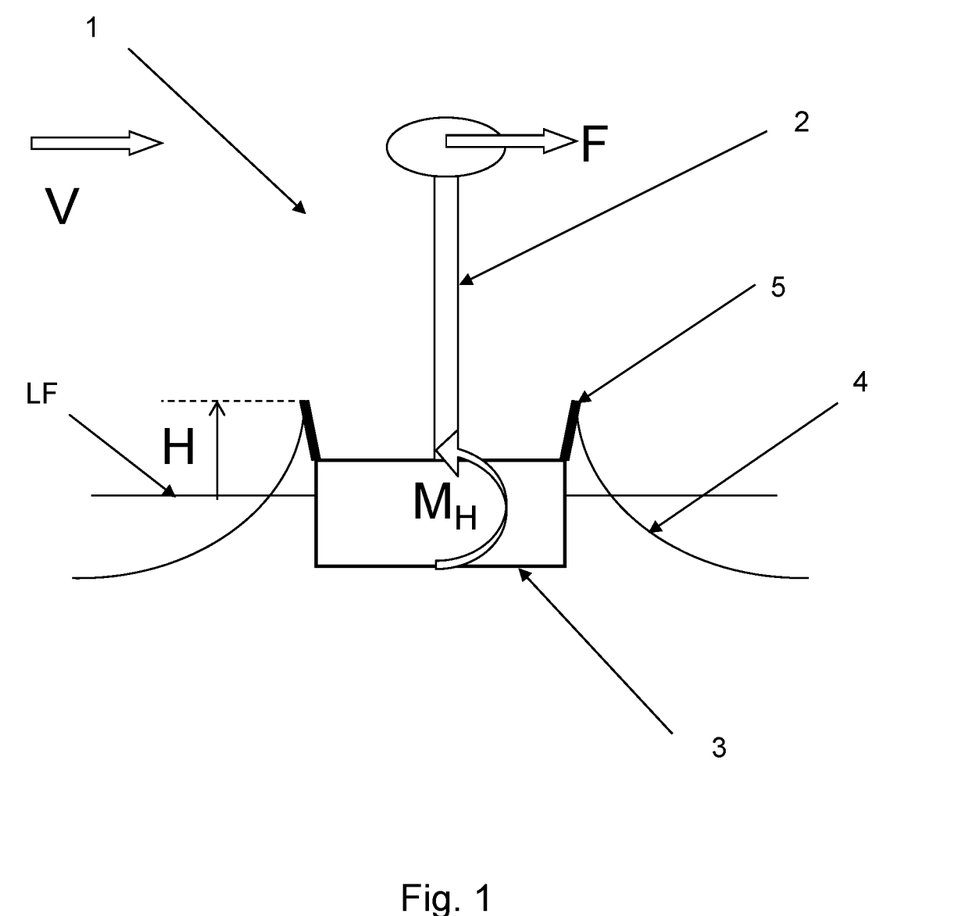
FIG. 1 diagrammatically shows an example of a wind power system according to the invention.

FIG. 1 illustrates an example of an offshore wind power system (1) according to the invention. Such a system comprises a wind turbine (2), a floating support (3) on which the wind turbine rests and anchoring means (4). The anchoring means are connected to the system by attachment points, conventionally at the floating support.

In order to overcome the overturning moment of the wind turbine ($M_h$) generated by the action (horizontal force F) of a wind of speed V on the turbine, without increasing size (B) of the floating support, raising means (5) for raising the attachment points above the waterline (LF) of the floater are added to this system. The attachment points are then connected at a height H above the waterline, this height being determined so that the anchor means counterbalance in the best possible way the overturning moment of the wind turbine for a given wind speed V.

There are many known types of floating support (semi-submersible, spar or TLP) and many types of anchor means (catenary, semi-taut or taut lines).

Anchor means conventionally comprise:
- a tensioning system, conventionally at the floater, for tensioning the line,
- the anchor line that can be made up of one or more chain and/or cable sections,
- a fairlead fastened to the floating support below the waterline that guides the line along the hull to the tensioning system. It is the attachment point for securing the anchor means to the floating support,
- a fastening means for securing the anchor line to the sea bed (anchor, piles, etc.).

PRINCIPLE OF THE INVENTION

The aim is to limit the inclination of the floating support under the effect of the overturning moment generated by the action of the wind on the turbine.

Figure 2:
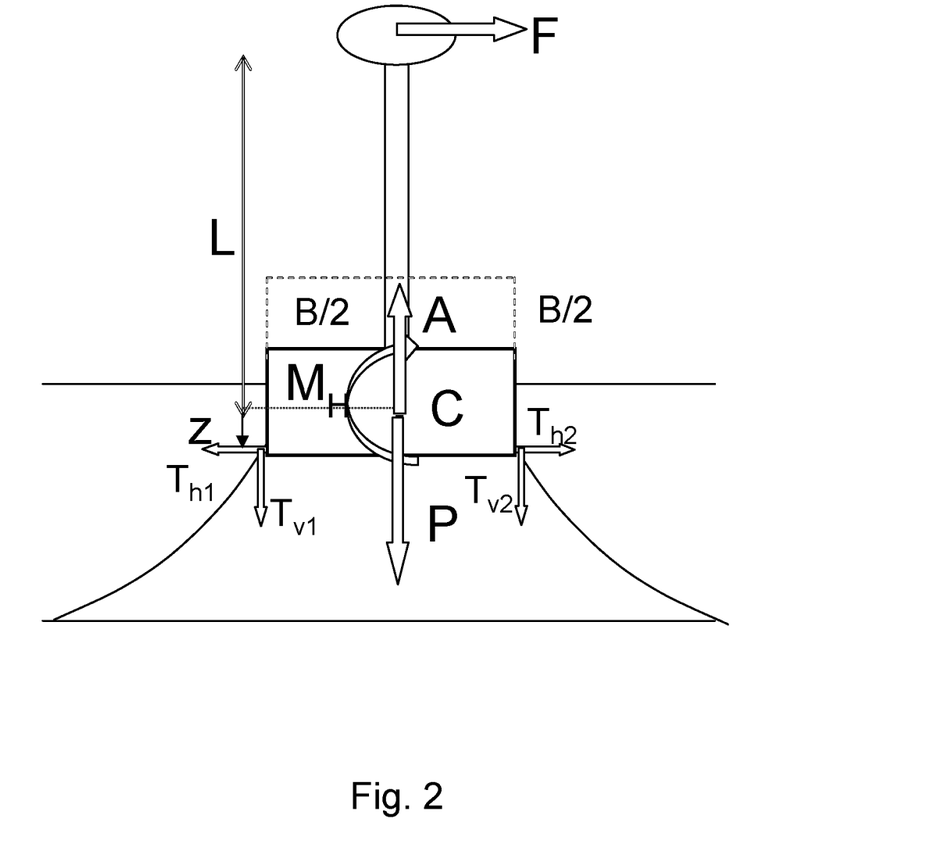
FIG. 2 illustrates the principle of the invention by showing the forces and the overturning moment of the wind turbine.

The invention is described in the case of a floating support of length B, in a plane anchored by two anchors and subjected to a horizontal force of intensity F, depending on wind speed V, applied on the nacelle (see FIG. 2). This force represents the rotor thrust under the action of a wind speed V.

The floater is thus subjected to its weight P applied at its centre of gravity, to the buoyancy A applied at the centre of buoyancy C (centre of gravity of the mass of displaced water), to external stresses and to the anchor reaction forces. The relative position of C and P creates, upon movement of the floater, a hydrostatic torque that balances the overturning moment related to the action of stresses external to the floater.

L is the vertical distance between the point of application of force F and centre of buoyancy C, and z the vertical distance between the anchor attachment point to the floater and the centre of buoyancy. z is positive if the attachment point is above the centre of buoyancy and negative if it is below. In FIG. 2, the anchor attachment points are located below the waterline.

We now analyze the balance of the anchored floater. Overturning moment $M_h$ can be written as follows:

$$M_h = F^*(L-z) + (T_{v2} - T_{v1})^* B/2$$

with:
$M_h$: overturning moment
F: intensity of the horizontal force
L: vertical distance between the point of application of force F and the centre of buoyancy
z: height of the attachment point with respect to the centre of buoyancy
$T_{v2}$: vertical component of tension T on anchor line 2
$T_{v1}$: vertical component of tension T on anchor line 1
B: length of the floating support.

To reduce the overturning moment, distance L-z needs to be reduced.

Thus, according to the invention, means for raising the attachment points above the waterline of the floater are used, thus increasing height z. Preferably, the raising means allow the attachment points to be positioned above the freeboard of the floating support. The freeboard is understood to be the distance between the water level (waterline) and the upper part of the floating support.

These raising means are dimensioned so as to raise the attachment points by a predetermined height with respect to the waterline so as to counterbalance the overturning moment of the turbine subjected to a given wind speed.

Raising Means

Figure 3:
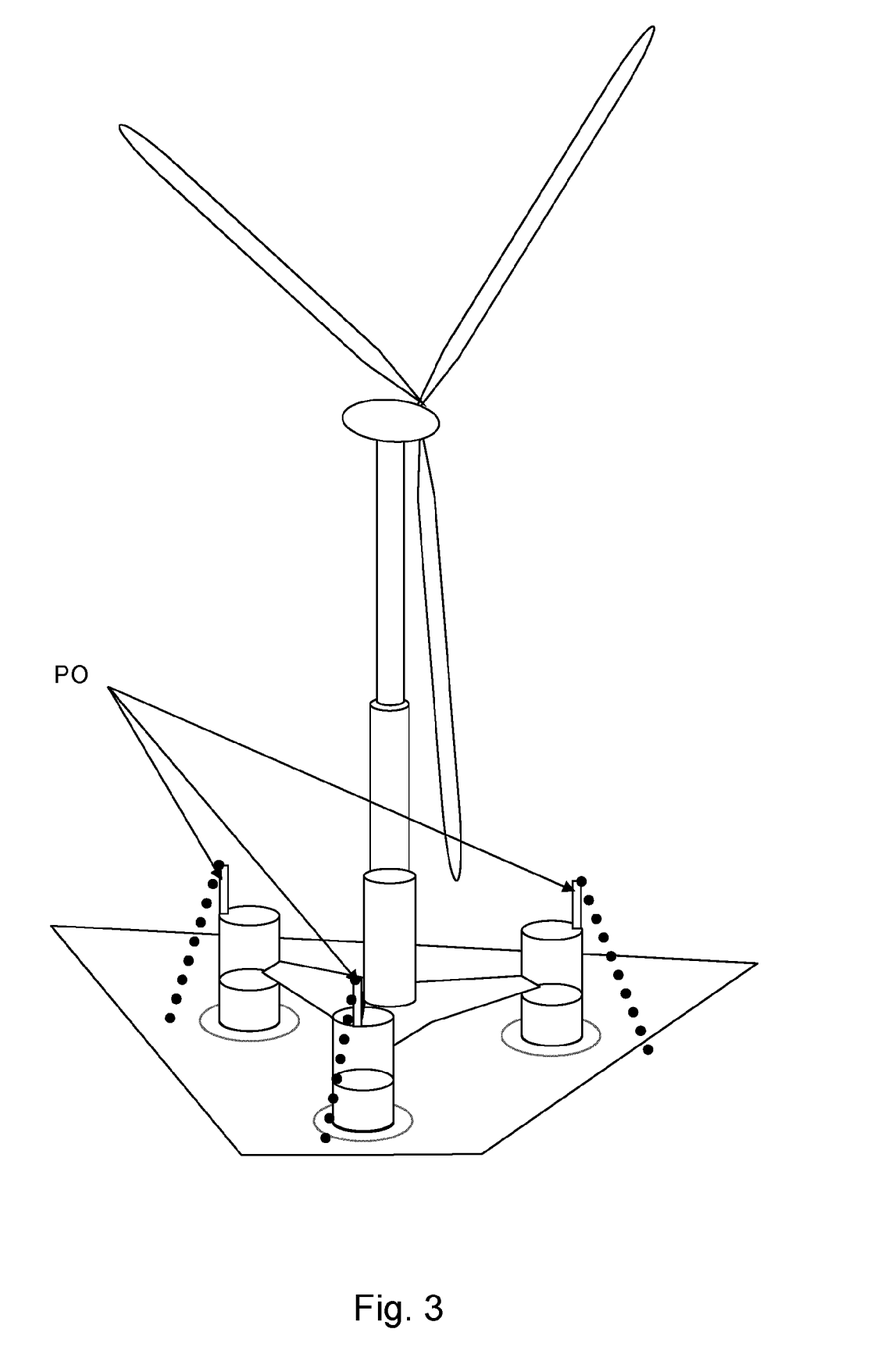
FIG. 3 illustrates raising means comprising beams (PO), or beams and cables.

According to an embodiment illustrated in FIG. 3, the raising means comprise beams (PO), or beams and cables. The beams can be tubular metal supports, or metal supports of variable section, or truss beams.

Figure 4:
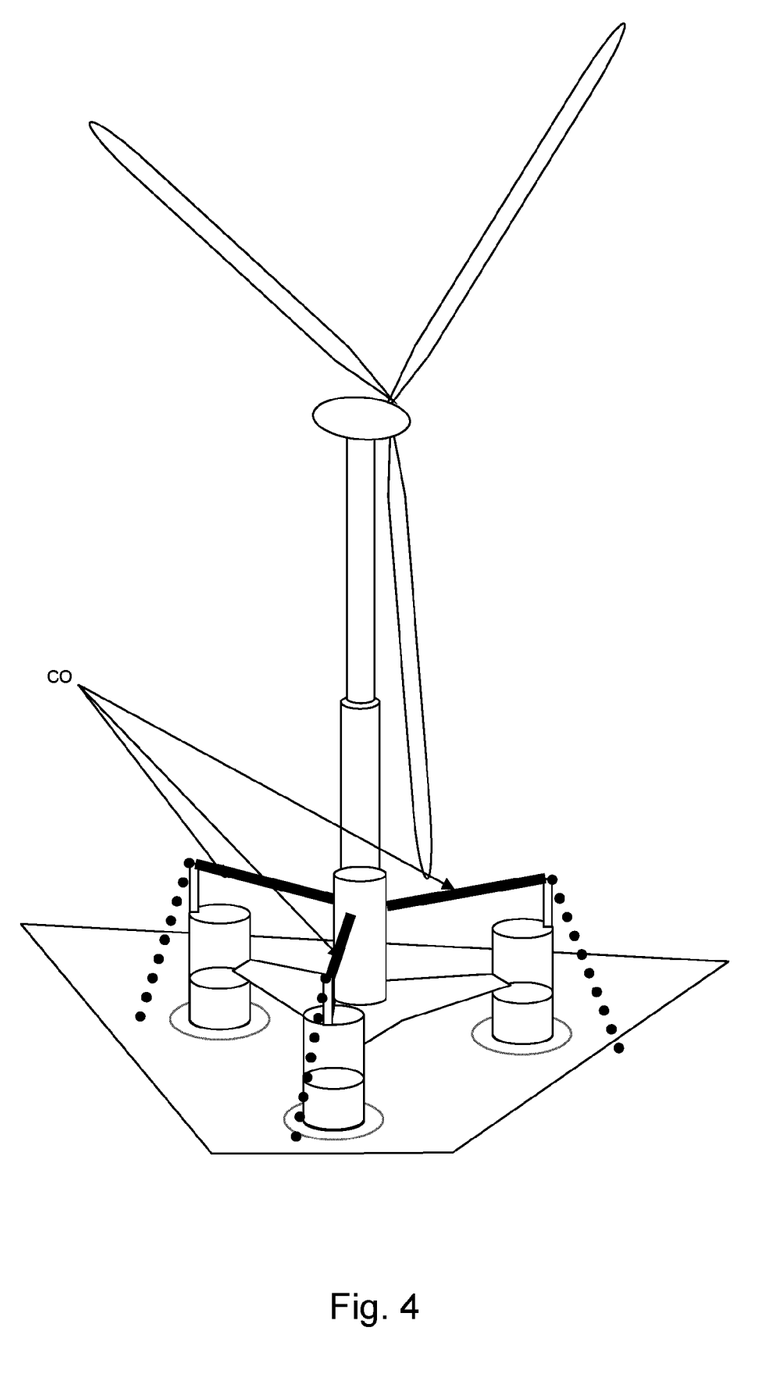
FIG. 4 illustrates raising means connected to the tower of the wind turbine by mechanical means (CO), such as beams or cables.

According to an embodiment illustrated in FIG. 4, the raising means are connected to the tower by mechanical means (CO) such as beams or cables.

Figure 5:
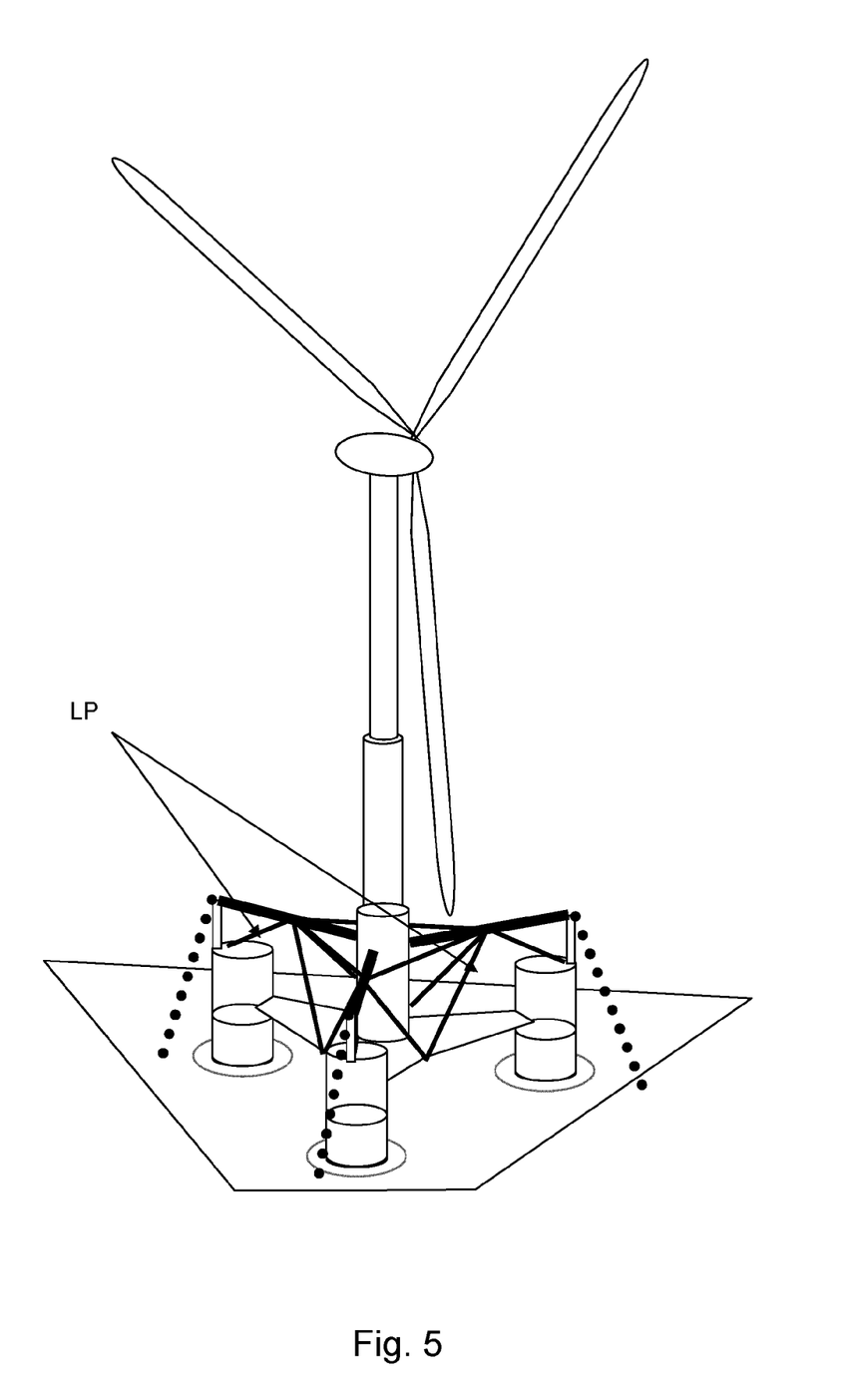
FIG. 5 illustrates raising means mechanically connected to one another by beams or cables (LP) so as to provide flexural stiffening of the raising means.

According to an embodiment illustrated in FIG. 5, the raising means are mechanically connected to one another by beams or cables (LP) so as to provide flexural stiffening of the raising means.

Figure 6:
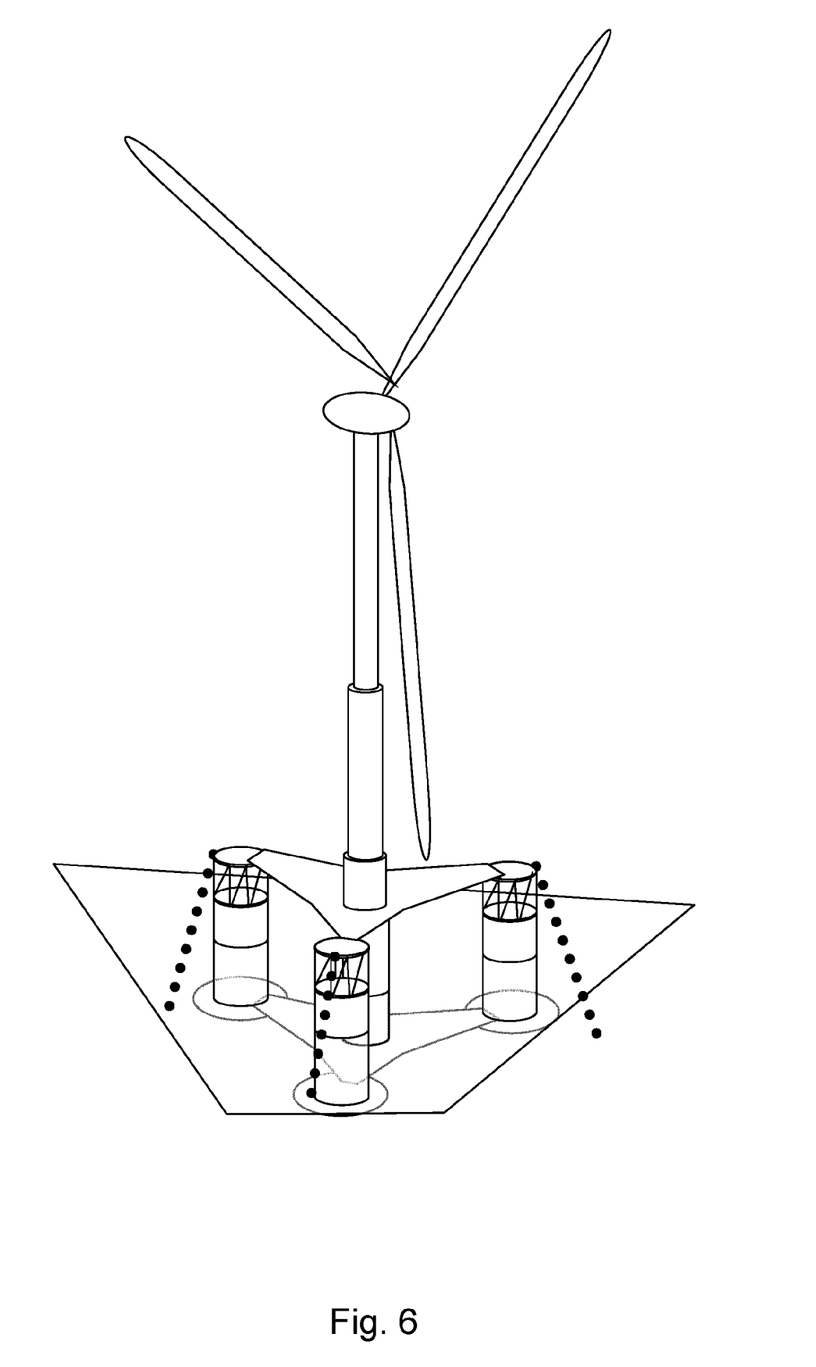
FIG. 6 illustrates raising means consisting of an extension of the columns of the floater, in form of a truss extension for example.

According to an embodiment illustrated in FIG. 6, the raising means consist of an extension of the columns of the floater, in form of a truss extension for example.

Figure 7:
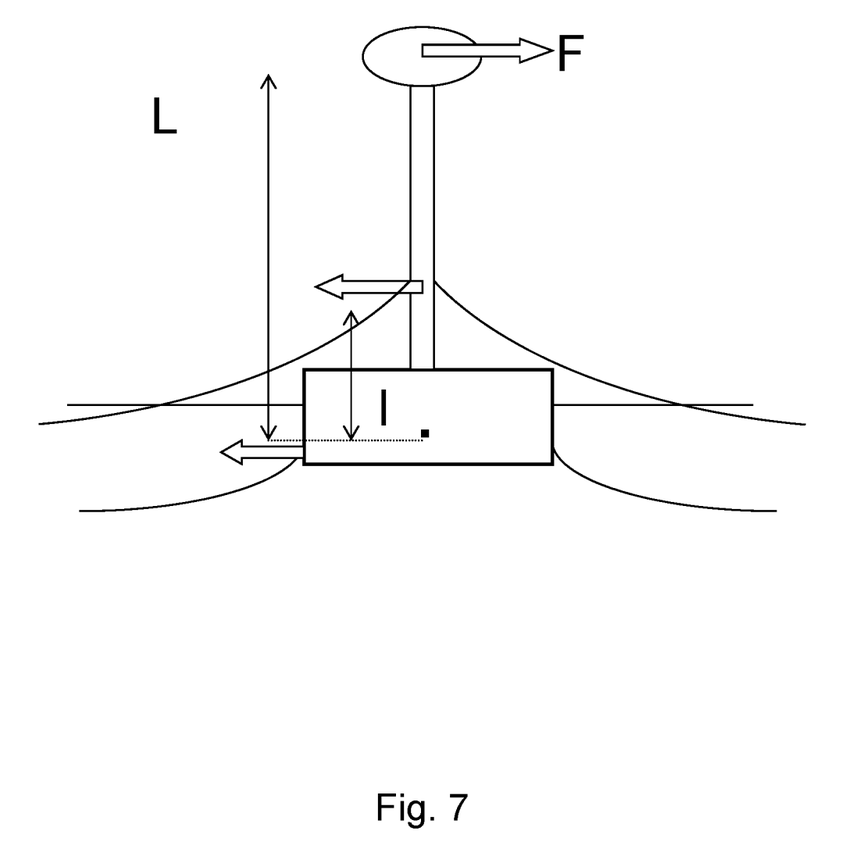
FIG. 7 illustrates raising means consisting of mechanical systems fastened to the tower so as to directly connect the anchor means to the tower and not to the floating support.

According to an embodiment illustrated in FIG. 7, the raising means consist of mechanical systems allowing to directly connect the anchor means to the tower and not to the floating support.

Figure 8:
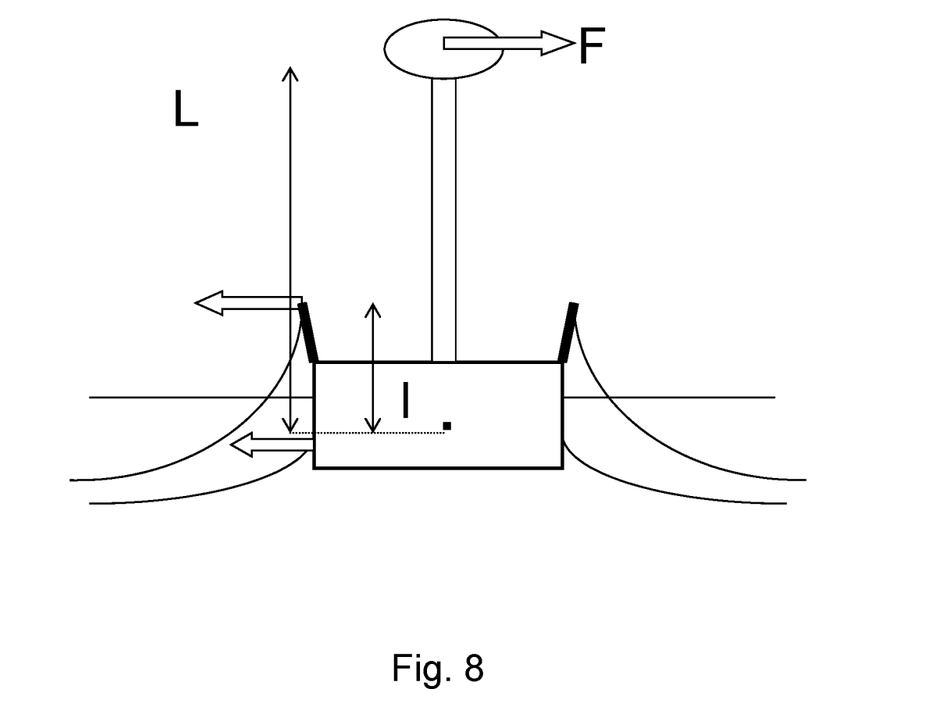
FIG. 8 illustrates an embodiment where the system comprises attachment points for attaching the anchor means at different heights.

According to an embodiment illustrated in FIG. 8, the system comprises attachment points for attaching the anchor means at different heights. For example, the system can comprise attachment points at the raising means and attachment points below the waterline.

Figure 9:
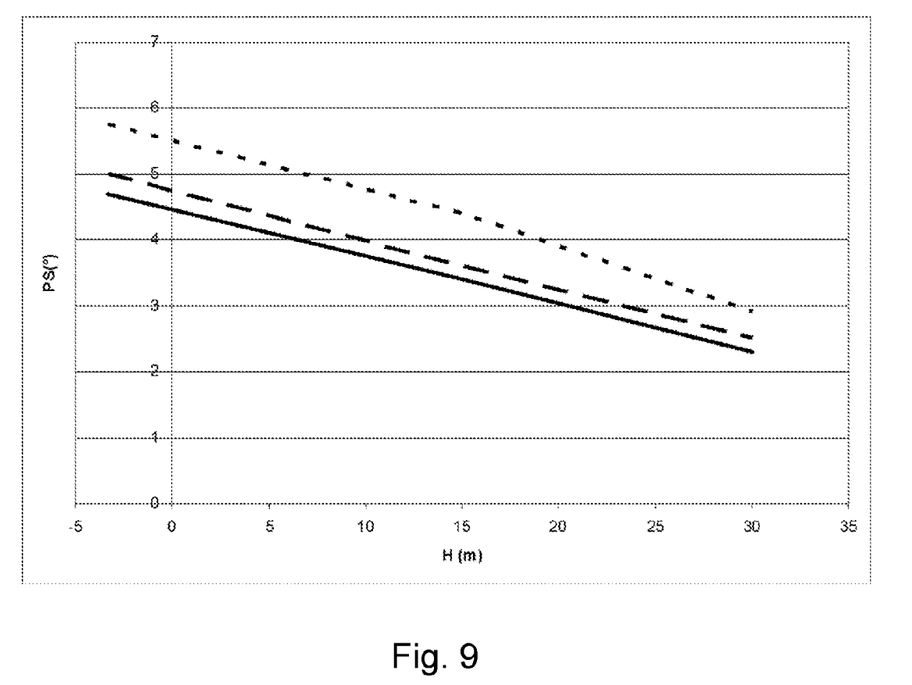
FIG. 9 shows the impact of height (H) of the attachment point on the list (PS) for three different linear densities.

FIG. 9 illustrates the advantages of the system according to the invention with its attachment point raising means, in the case of a tri-floater type floating support. FIG. 9 shows the impact, for the same tension, of height (H) of the attachment point (height measured above the waterline) on the list (PS) for three different linear densities (100 kg/m in dotted line, 450 kg/m in dashed line and 900 kg/m in solid line).

It is observed (FIG. 9) that, whatever the anchor characteristic (linear density), in this case the list is reduced by nearly half when raising the anchors by 30 meters with iso-pretension.

The invention claimed is:

1. A wind power system comprising a wind turbine resting on a floating support and means for anchoring the system, connected to said system by attachment points, characterized in that said system comprises means for raising said attachment points above a waterline of said floating support, said means for raising said attachment points raising said attachment points to a height with respect to the waterline, the height with respect to the waterline being determined so as to counterbalance an overturning moment of the wind turbine subjected to a given wind speed.

2. A system as claimed in claim 1, characterized in that said attachment points are located above a freeboard of the floating support.

3. A system as claimed in claim 1, wherein said means for raising said attachment points comprise beams, or beams and cables.

4. A system as claimed in claim 3, wherein the beams are tubular metal supports, or metal supports of variable section, or truss beams.

5. A system as claimed in claim 1, wherein the means for raising said attachment points are mechanically connected to a tower of the wind turbine.

6. A system as claimed in claim 1, wherein the means for raising said attachment points are mechanically connected to one another by beams or cables, so as to provide flexural stiffening of said means for raising said attachment points.

7. A system as claimed in claim 1, wherein the means for raising said attachment points comprise an extension of columns of the floating support.

8. A system as claimed in claim 1, wherein the attachment points are located at different heights.

9. A wind power system, comprising:
   a floating support;
   a wind turbine supported on the floating support by a tower; and
   an anchoring system for anchoring the floating support to a sea bed, the anchoring system including at least one anchor line and a fastener for securing one end of the at least one anchor line to the sea bed; and
   attachment points provided on the floating support or on the tower configured to attach another end of the at least one anchor line, the attachment points being provided a predetermined distance above a waterline of the floating support, the predetermined distance being determined so as to counterbalance an overturning moment of the wind turbine subjected to a given wind speed.

10. A system as claimed in claim 9, wherein the attachment points are provided above an upper part of the floating support.

11. A system as claimed in claim 10, wherein the attachment points are connected to the floating support.

12. A system as claimed in claim 10, wherein the attachment points are connected to the tower.

13. A system as claimed in claim 9, wherein the attachment points are connected to the floating support.

14. A system as claimed in claim 9, wherein the attachment points are connected to the tower.

* * * * *